J. W. STINSON.
TIRE INSULATION.
APPLICATION FILED APR. 7, 1917.

1,285,454.

Patented Nov. 19, 1918.

WITNESSES:

J. Whitla Stinson
INVENTOR
BY
ATTORNEYS

UNITED STATES PATENT OFFICE.

JOSEPH WHITLA STINSON, OF GARDEN CITY, NEW YORK.

TIRE INSULATION.

1,285,454.  Specification of Letters Patent.  Patented Nov. 19, 1918.

Application filed April 7, 1917. Serial No. 160,564.

*To all whom it may concern:*

Be it known that I, JOSEPH WHITLA STINSON, a citizen of the United States of America, residing at Garden City Hotel, Garden City, Long Island, New York, have made certain new and useful Improvements in Tire Insulations, of which the following is a specification.

My invention relates to the insulating of pneumatic tires, and consists of a detachable heat-retarding sheath to be inserted between the inner pneumatic tube and the outer casing or shoe, and of such construction and material as will wholly prevent or substantially diminish the communication of intense frictional heat from the outer casing or shoe of a pneumatic tire, to the air within the inner pneumatic tube, and so obviate the most fruitful cause of "blow-outs" to wit: the explosive expansion of air and generated gas, occasioned by such communication of intense heat to the air within the pneumatic tube, already subjected to a pressure of from seventy-five to one hundred pounds to the square inch. The sheath is made of woven asbestos strands having an elastic core and so combines resilience and non-heat conducting properties. Its shape substantially conforms to the inner circumference of the outer shoe. Its resilience admits of perfect conformity when the inner pneumatic tube is inflated.

The rubber core of the strands is spirally and closely wound with asbestos cord, and the fabric is so woven that when the sheath is in place between the inner pneumatic tube and the inner surface of the outer casing or shoe, all the cords will run transversely with reference to the center line of the periphery of the outer shoe at which point the woven elastic-asbestos fabric should be thickest. This will result in causing the woven elastic-asbestos fabric to tighten the already close weaving, at the point where the highest degree of frictional heat is communicated, to wit: the center line of the periphery of the outer shoe.

It is generally known as a matter of common observation, that tires "blow out" much more often in summer than in winter. This fact supports my theory that "blow outs" which are not directly consequent upon puncture, are occasioned by excessive heat which, created by the frictional resistance of the outer surface of the tire or shoe against the road, reaches the air in the pneumatic tube.

My invention therefore, has as a primary object, the insulation from heat, of the air in the inner tube.

Another object of my invention is to prevent the flexing of the inner pneumatic tube as the tire rotates while the car is in motion on the road. This is accomplished by the elastic quality of the asbestos-rubber-cored sheath.

Too much stress cannot be laid upon this retarding or preventing of the passage of heat to the air in the inner tube, and upon this preventing of flexing of the inner tube while the wheel is running on any surface. The flexing or continued creasing of the inner tube obviously creates a point of weakness and superinduces a "blow out" at that point. The elastic quality of sheath or fabric will contribute to a restoration of the original position of the rubber of the inner tube, after it passes the point of stress at the center line of the outer periphery next to the roadbed, in the process of rotation. Likewise the fabric itself because of its elastic quality always tends to a restoration of the original position of the transversely arranged rubber-cored threads after they have passed the point of stress in the process of rotation.

My application has nothing to do with armaments against puncture, though it might well be used in combination therewith. Nor is it designed to prevent the heating of the tire (*i. e.* the complex body of rubber, etc., though it might well be used in the body of the shoe) but is to prevent the heating of the air in the inner pneumatic tube of the tire, and to prevent flexing.

The warping of the sheath so as to give it a tubular form (adaptable to fitting into the tire) will be achieved in the process of weaving by drop-stitching or other weaving process, but this process is not the subject of present application.

The sheath (as I prefer to call it) could be designed in diameter, etc., to fit every type of pneumatic tire and given wheel bases, and could be removed and be reincorporated in new shoes after puncture of the old; and accordingly would outlive the life of the shoes as well as the life of the pneumatic inner tube. Obviously it would in no way lessen the resilience of the tire, inflated under load.

As an article of manufacture, this elastic, asbestos, non-absorbent, heat-retarding fabric may obviously be put to other commercial uses.

Other objects and advantages and modifications will appear in the following specifications, and the novel features of the device will be further pointed out in the appended claims.

My invention is illustrated in the accompanying drawings which form a part of this application.

Figure 1 shows side elevation of the elastic asbestos heat-retarding sheath partly broken away.

Dotted line "F" indicates the periphery of the outer shoe of a pneumatic tire as it would appear with the elastic heat-retarding sheath in place therein.

"B" indicates sectional view showing position of the transversely woven elastic threads from the inside of the sheath.

"a" represents the cross-section of the elastic sheath through which the sectional view is taken.

"b" represents the inner edge of the elastic sheath.

"c" represents the cross-section of the outer shoe of a tire—the elastic sheath being shown sectionally in place and within it the inner pneumatic tube.

"d" represents the cross-section of the inner pneumatic tube in sectional view "C."

"C" represents a sectional view of the inner pneumatic tube in place in a pneumatic tire, the outer shoe being shown sectionally "c" and the inner pneumatic tube being shown sectionally "d."

"D" represents the outer view of the inner pneumatic tube.

"g" represents the spirally wound asbestos cord.

"h" represents the rubber core of such elastic cords.

Figures 3, 4, 5:
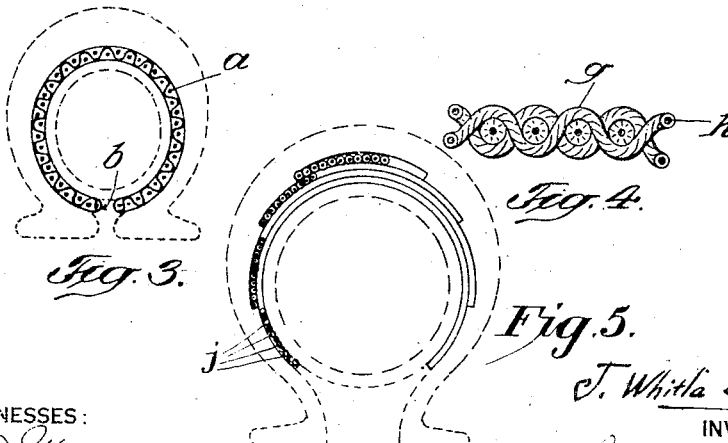
Fig. 3 is a cross-sectional view of the elastic sheath at any point in its periphery and illustrates—by the surrounding dotted lines—the inner tube and outer shoe of a pneumatic tire as they would appear relatively to the elastic sheath—when in position in said tire.
Fig. 4 illustrates a form of weaving—and indicates the core of rubber filaments or bands—around which is spirally wound asbestos cord or thread.

Fig. 5 illustrates several layers of the woven fabric consisting of elastic asbestos strands superimposed, graduated as to size and the layers thickest at the point nearest the center line of the outer periphery of the outer-shoe; the lower layer consisting of, and illustrating a woven fabric consisting of strands with a rubber core interwoven alternately with plain asbestos cord as warp and woof.

"j" represents the plain asbestos cord.

In carrying out my invention I make use of one or more layers of the elastic asbestos heat-retarding fabric, so woven together in one continuous band, that it is thickest at the point nearest the center line of the outer periphery of the outer shoe, where the frictional heat is generated, as shown in Fig. 5.

The elastic properties of the sheath will permit of its being incorporated in the very body of the shoe, if thought desirable by tire manufacturers, but the sheath is designed primarily as an independent detachable device, adaptable to any form of pneumatic tire.

The sheath or fabric will be preferably so constructed, that it will be given at once a tubular shape, and the threads will run at 45° to the center line of the outer periphery of the tire, so that if the tire be imagined to be a ring of circular cross section, such thread would in direction be spirally and continuously wrapped around it.

The elastic properties of this detachable elastic, heat-retarding sheath, and the arrangement of its cords transversely with reference to the center line of the periphery of the outer shoe, (shown by "B" in Fig. 1) precludes the flexing or creasing of the inner pneumatic tube, which flexing is supposed to be an important contributing cause of the bursting of tires and is believed to be the proximate cause of the so-called "slow puncture".

Its elastic properties will also permit it to readily conform to the inner surface of the shoe, when the pneumatic tube is filled and when the tire undergoes deformations, and would prevent it from deteriorating from the tendency of the tire to flex when in use.

Figures 1, 2:
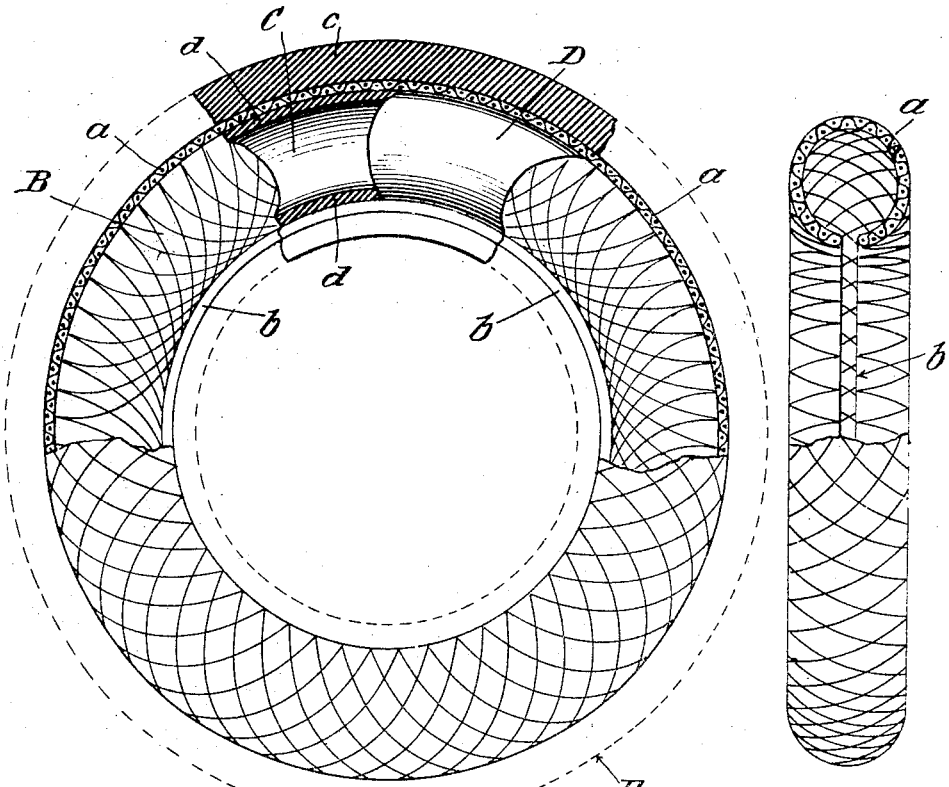
Fig. 2 illustrates a front elevation of the elastic sheath showing the transverse weaving of the elastic threads from the inside and from the outside, part of the sheath being cut away to show the two aspects respectively.

The sheath, while of a tubular shape, would not be a closed tube as it would have to be open on its inner side to admit of the pneumatic tube, as illustrated in Fig. 2.

The elastic threads may be interwoven in a warp and woof with plain asbestos cord or yarns (as illustrated in Fig. 5) or all the threads may preferably be of the elastic kind, woven into a warp and a woof and conformed as above indicated to a tubular shape.

The heat-retarding qualities of the material used in the sheath would not be the sole agent in insulating the inner pneumatic tube, but its intervention between the shoe and tube would leave in the minute interstices of the fabric, air which in itself would act as an insulator.

A concrete description of the most preferred form, would be a detachable, elastic, heat-retarding sheath, in the form of a belting of one continuous fabric, in conformation, so as to fit the inner surface of the shoe, and admit of incasing the pneumatic tube.

I claim:

1. An article of manufacture consisting of closely woven strands, which strands consist of a core of rubber about which is wound asbestos cord.

2. An article of manufacture, consisting of closely woven strands of plain asbestos cord woven together as warp and woof, with strands consisting of a core of rubber about which is wound asbestos cord.

3. A detachable sheath of elastic, heat-retarding asbestos fabric, tubularly conforming in shape to the inner surface of the outer shoe of a pneumatic tire and open the length of its inner circumference, constructed of closely woven strands, which strands consist of a core of rubber about which is wound asbestos cord; the fabric to be so woven that all its threads will run at an angle of forty-five degrees to the center line of the outer periphery of the sheath and to the center line of the outer periphery of the shoe of the tire when the sheath is inserted; for use in combination with, and for insertion between the inner pneumatic tube and the outer shoe of a pneumatic tire, or in the body of the outer shoe.

4. A detachable sheath of elastic, heat-retarding asbestos fabric, tubularly conforming in shape to the inner surface of the outer shoe of a pneumatic tire and open the length of its inner circumference; constructed of strands consisting of a core of rubber about which is wound asbestos cord, for use in combination with and for insertion between the inner pneumatic tube and the outer shoe of a pneumatic tire, or in the body of the outer shoe.

5. A detachable sheath of elastic, heat-retarding fabric, tubularly conforming in shape to the inner surface of the outer shoe of a pneumatic tire and open the length of its inner circumference; constructed of strands consisting of a core of rubber about which is wound asbestos cord and woven into a fabric with strands of asbestos cord; the fabric to be so woven that all its threads will run at an angle of forty-five degrees to the center line of the outer periphery of the sheath and to the center line of the outer periphery of the shoe of the tire when the sheath is inserted; for use in combination with and for insertion between the inner pneumatic tube and the outer shoe of a pneumatic tire, or in the body of the outer shoe.

This specification signed and witnessed this 28th day of March, 1917.

JOSEPH WHITLA STINSON.

In the presence of—
A. IRVING SCOTT,
JOHN L. CLASS.